US010726066B2

(12) United States Patent
Liau

(10) Patent No.: US 10,726,066 B2
(45) Date of Patent: Jul. 28, 2020

(54) SYSTEM AND METHOD FOR DIRECTING CONTENT TO USERS OF A SOCIAL NETWORKING ENGINE

(76) Inventor: Soon Teck Frederick Noel Liau, Singapore (SG)

( * ) Notice: Subject to any disclaimer, the term of this patent is extended or adjusted under 35 U.S.C. 154(b) by 0 days.

(21) Appl. No.: 13/696,181

(22) PCT Filed: May 6, 2011

(86) PCT No.: PCT/SG2011/000179
§ 371 (c)(1),
(2), (4) Date: Jan. 29, 2013

(87) PCT Pub. No.: WO2011/139238
PCT Pub. Date: Nov. 10, 2011

(65) Prior Publication Data
US 2013/0124499 A1 May 16, 2013

Related U.S. Application Data

(60) Provisional application No. 61/331,975, filed on May 6, 2010.

(51) Int. Cl.
*G06F 16/58* (2019.01)
*G06F 16/583* (2019.01)
(Continued)

(52) U.S. Cl.
CPC .......... *G06F 16/5854* (2019.01); *G06F 9/06* (2013.01); *G06F 15/16* (2013.01); *G06F 16/21* (2019.01);
(Continued)

(58) Field of Classification Search
CPC .. G06F 16/5854; G06F 16/21; G06F 16/5866; G06F 16/951; G06F 9/06; G06F 15/16; G06F 17/40
See application file for complete search history.

(56) References Cited

U.S. PATENT DOCUMENTS

2005/0273452 A1* 12/2005 Molloy ............. G06F 17/30595
2006/0173957 A1* 8/2006 Robinson ............... G06Q 10/10
709/204
(Continued)

FOREIGN PATENT DOCUMENTS

JP  2003-187255     7/2003
WO  2008/144412 A2  11/2008

OTHER PUBLICATIONS

SQL Auto Increment Field by w3schools.com, Jan. 7, 2009 http://www.w3schools.com/sql/sql_autoincrement.asp.*
(Continued)

*Primary Examiner* — Robert W Beausoliel, Jr.
(74) *Attorney, Agent, or Firm* — BakerHostetler

(57) ABSTRACT

A system and method for providing a third generation social network. The system provides processes that allow physical objects to be represented as social objects in the social network. A user may then interact with the social objects. These interactions allow the system to collect the content of the interactions of a particular user. The content of the interactions may then be analyzed and used to direct specific content to specific users that may have an interest in the specific content as indicated by the content of the interactions of those users. Furthermore, the system provides a method for associating data with a shape in an image to allow a user and/or groups of users to interact with the image.

6 Claims, 11 Drawing Sheets

(51) Int. Cl.
*G06F 16/21* (2019.01)
*G06F 16/951* (2019.01)
*G06F 9/06* (2006.01)
*G06F 17/40* (2006.01)
*G06F 15/16* (2006.01)

(52) U.S. Cl.
CPC ........ *G06F 16/5866* (2019.01); *G06F 16/951* (2019.01); *G06F 17/40* (2013.01)

(56) References Cited

U.S. PATENT DOCUMENTS

| | | | |
|---|---|---|---|
| 2006/0197763 A1 | 9/2006 | Harrison et al. | |
| 2007/0239848 A1 | 10/2007 | Avery | |
| 2008/0040474 A1* | 2/2008 | Zuckerberg | G06Q 30/02 709/224 |
| 2008/0091723 A1 | 4/2008 | Zuckerberg et al. | |
| 2008/0918723 | 4/2008 | Zuckerberg et al. | |
| 2008/0133336 A1* | 6/2008 | Altman | G06Q 30/0207 455/456.1 |
| 2008/0243631 A1* | 10/2008 | Kane | G06Q 30/02 705/14.5 |
| 2009/0024747 A1* | 1/2009 | Moses | H04L 41/22 709/228 |
| 2009/0119167 A1* | 5/2009 | Kendall et al. | 705/14 |
| 2009/0204354 A1* | 8/2009 | Davis et al. | 702/89 |
| 2009/0299990 A1* | 12/2009 | Setlur | G06F 17/30265 |
| 2009/0319288 A1* | 12/2009 | Slaney | G06Q 30/02 705/1.1 |
| 2009/0324137 A1 | 12/2009 | Stallings et al. | |
| 2010/0318544 A1* | 12/2010 | Nicolov | G06Q 30/0202 707/759 |
| 2011/0137902 A1* | 6/2011 | Wable et al. | 707/737 |

OTHER PUBLICATIONS

Database Systems Concepts, Chapter 2: Entity-Relationship Model, Silberschatz, Korth and Sudarshan c 1997, http://www.cs.toronto.edu/~faye/343/w08/lectures/wk6/6ERModelPart2-2up.pdf.*
MySQL SAL Syntax and Use written by Paul Dubois, http://www.informit.com/articles/article.aspx?p=377653&seqNum=8, Apr. 8, 2005.*
Entity-Relationship Model, http://www.cs.toronto.edu/~faye/343/f07/lectures/wk10/10_ERModel4up.pdf, Apr. 24, 2009 (Year: 2009).*
Japanese Office Action in JP 2013-509033, with English language translation, dated Feb. 24, 2015.
Russell, Bryan C., LabelMe: a database and web-based tool for image annotation, International Journal of Computer Vision, [online], May 2008, vol. 77, Issue 1-3, pp. 157-173, http://www.cs.ubc.ca/~murphyk/Papers/labelmeIJCV08.pdf.
Office Action in Taiwanese Application No. 100116095, dated Aug. 11, 2015.
Office Action in Chinese Application No. 201180033557, dated Apr. 3, 2015.

* cited by examiner

SYSTEM AND METHOD FOR DIRECTING CONTENT TO USERS OF A SOCIAL NETWORKING ENGINE

FIELD OF THE INVENTION

This invention relates to social networking engines. More particularly, this invention relates to processes for associating users, objects, and services in social networking engines. Still more particularly, this invention relates to processes for associating users and objects in social networking engines to provide desired content to users.

SUMMARY OF THE PRIOR ART

Social networking engines have gained popularity in recent years. Two of the more well known social networking engines are Facebook and Myspace. Originally, social network engines operated in a manner similar to a "blog" in which a user may post updates or comments for others to see. Then, social network engines allowed users to make associations or "friends" that allowed associated users to share content with one another through postings to the engines. The social network engines then started to allow "actions" such as the sending of gifts in "on-line" games; uploading and tagging of photos; etc. to allow users to interact with one another.

As social networks have evolved, one problem that has evolved has been keeping users interested in the activities provided by the network to maintain traffic to the engines. It is known that users commonly get tired of looking at the comments of others or playing games provided by the network. Thus, the users stop frequenting the engine. This can affect the advertising sales of the engines. To counter this problem, social network engines constantly try to add new games and/or features to provide the users with different content to keep their interest in the engine. However, this does not address the problem when users tire of the games and other content. Thus, those skilled in the art are constantly striving to find new social networking models to change the features provided by these social networks to maintain user interest in using the engines providing a social network.

One problem encountered in providing new content is that the networks are confined to a digital world. Thus, only words and other visual and audible images may be used for interaction. This confines the interactions in the social network to interactions between people. However, those skilled in the art see a need to expand the content to allow interaction with objects in the physical world to expand the content that may be provided.

A second problem is that the users want to expand social networks to contain more content than information about other users. Often, users want to share information about "social objects" such as products, locations, events, and other objects with their contacts. As such, the users desire a social network that provides a system that allows a user to interact with these types of "social objects".

A third problem for social network providers is finding revenue streams from providing the social network. Typically, the social network providers generate revenue from selling advertisements on the social networking engines. However, advertisers often desire to only target users of the social networking engines that fit the particular demographics for the advertised products. The demographics may include the location, age, and interest of the users. Thus, the advertisers desire a system that identifies specific users and targets advertisements for specific products to those specific users of the social network engine.

SUMMARY OF THE INVENTION

The above and other problems are solved and an advance in the art is made by a system and method for directing content to users of a social network engine in accordance with this invention. A system in accordance with this invention has the advantage of making a social network engine more dynamic by making objects, such as pictures and social functions, "social objects" in the social network engine to allow interaction with the objects as well as users to make the social network engine more interactive to maintain user interest. A second advantage of a system in accordance with this invention is that the interaction of users with social objects allows more data to be collected from users that may then be used to provide specific content, such as advertisements, to the specific users to maximize the effect of content provided to the users.

In accordance with some embodiments of this invention, a provider of a social network allows text to be associated with portions of images in the following manner to facilitate the use of "social object". The system receives an image from a user. The system then determines a shape in the image. Data describing the shape is then stored in a record associated with the image in an image database. An input of text to associate with the shape is then received from the user. The text may be a descriptor of the object or a web site associated with the object in accordance with some of these embodiments. An indicator of the text and the shape is then stored in the record. The indicator is then embedded in the image proximate a location of the shape in the image. A link to the record in the image database is then embedded in the image database.

In accordance with some embodiments, the determination of the shape is performed in the following manner. The system receives an input of a portion of an image. An object in the input portion of image is then identified. An outline of the identified object is then defined to produce the shape. In accordance with some of these embodiments, the user may input modifications to the shape by adjusting the outline.

In accordance with some of these embodiments, the input text may be received in the following manner. The system first receives an input of an identifier of an object. A database is then searched for a record storing information for an object based on the input identifier. The information from the record for the object is then displayed. The user may then input modifications to the information which is then stored in the record. If a record associated with the identifier is not found in the database, a new record is created for the identifier.

In accordance with some embodiments, the image may be viewed in the following manner. The system receives a selection of the link to database embedded in the image. The system then displays the image associated with the link including all embedded indicators. The system then receives an input indicating a selection of an indicator from the displayed image. The text associated with the link read from the record in said image database and displayed with the image.

In accordance with other embodiments of this invention, a user is allowed to interact with "social objects" provided by a social network. Data regarding the interactions may then be used to direct content to the user.

BRIEF DESCRIPTION OF THE DRAWINGS

The above and other advantages and features of a system in accordance with this invention are described in the following detailed description and are shown in the following drawings.

DESCRIPTION OF THE INVENTION

Figure 1:
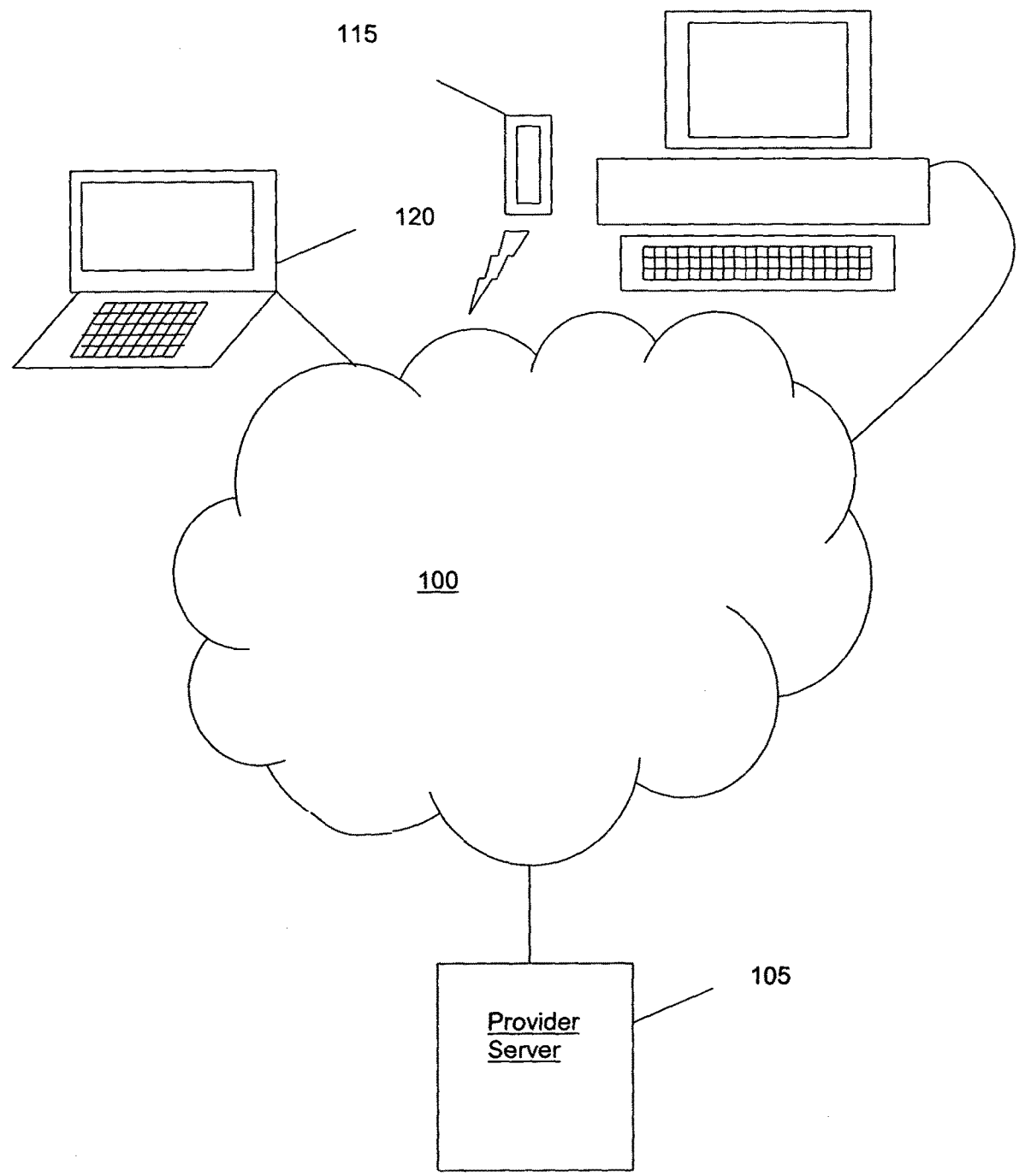
FIG. 1 illustrates a network including a server providing a system in accordance with embodiments of this invention.

FIG. 1 illustrates network 100 including provider server 105 and client devices 110,115, and 120. Network 100 is a network such the Internet that allows processing system to communicate with one another. Provider server 105 is server or group of servers that store data and execute processes that provide content such as a social network to users over network 100. Device 110 is a traditional desktop computer system that is connected to network 100 via either a wire or wireless connection and accesses the content of the provider via a web browser application performed by device 110. Device, 115 is mobile device such a smartphone or Person Digital Assistant (PDA) that is connected to network 100 via a wireless and performs a web browser or other specific application to access the content provided by the provider. Device 120 is a laptop computer is a conventional laptop computer that is connected to network 100 via a wire or wireless connection and that accesses the provider content via a web browser or other application. One skilled in the art will recognize that devices 110, 115, and 120 are only provided as examples and other types of user devices may be used to access the content of the provider without departing from this invention.

Figure 2:
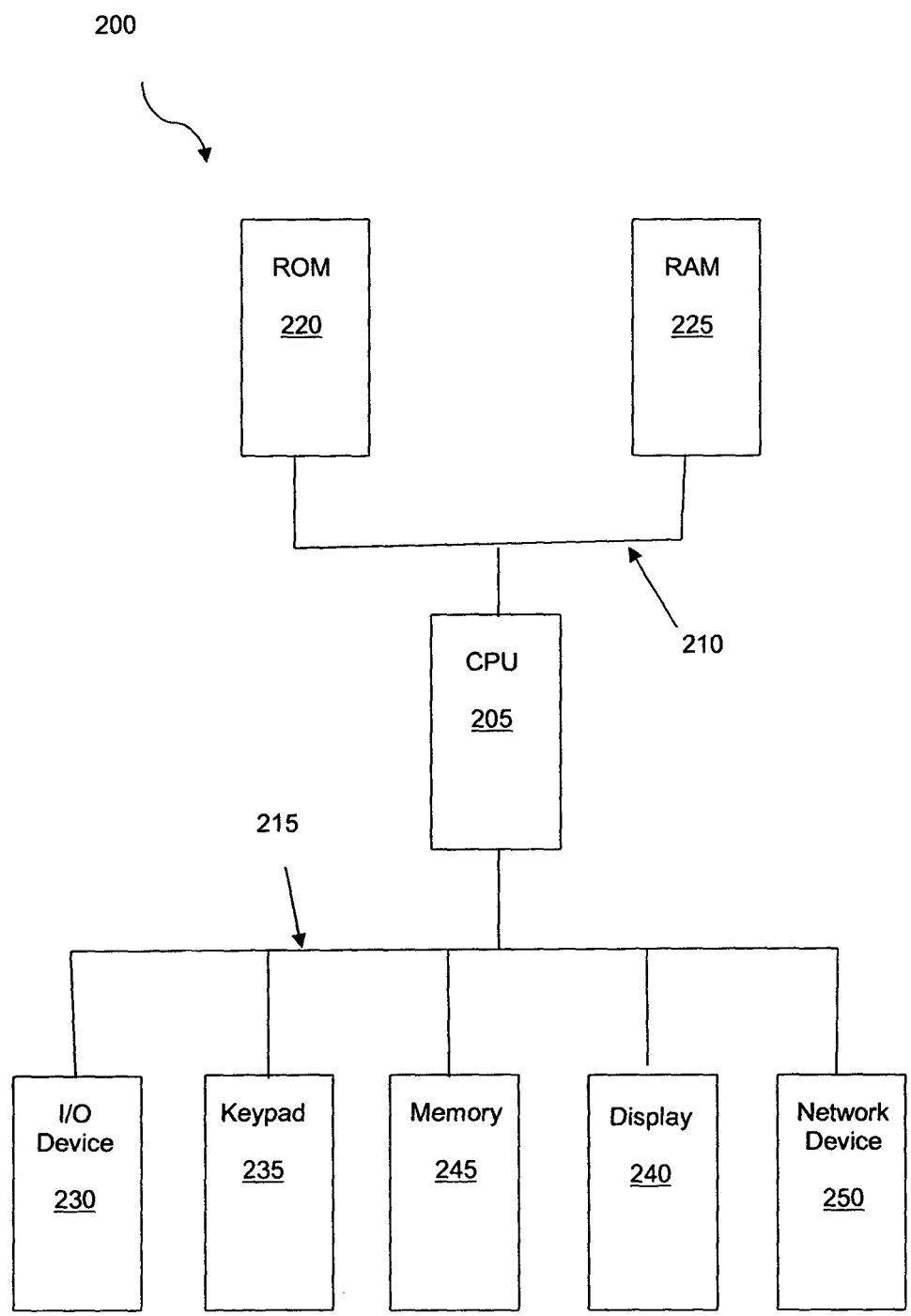
FIG. 2 illustrating a processing system in a device shown in FIG. 1.

Processes provided by instructions stored by a media that are executed by a processing system in a user's computer system and one or more server perform provide this invention. The instructions may be stored as firmware, hardware, or software. FIG. 2 illustrates processing system 200 such as the processing system in the user's computer system and servers that execute the instructions to perform the processes for providing a method and/or system in accordance with this invention. One skilled in the art will recognize that the exact configuration of each processing system may be different and the exact configuration of the processing system in each device may vary and FIG. 2 is given by way of example only.

Processing system 200 includes Central Processing Unit (CPU) 205. CPU 205 is a processor, microprocessor, or any combination of processors and microprocessors that execute instructions to perform the processes in accordance with the present invention. CPU 205 connects to memory bus 210 and Input/Output (I/O) bus 215. Memory bus 210 connects CPU 205 to memories 220 and 225 to transmit data and instructions between the memories and CPU 205. I/O bus 215 connects CPU 105 to peripheral devices to transmit data between CPU 205 and the peripheral devices. One skilled in the art will recognize that I/O bus 215 and memory bus 210 may be combined into one bus or subdivided into many other busses and the exact configuration is left to those skilled in the art.

A non-volatile memory 220, such as a Read Only Memory (ROM), is connected to memory bus 210. Non-volatile memory 220 stores instructions and data needed to operate various sub-systems of processing system 200 and to boot the system at start-up. One skilled in the art will recognize that any number of types of memory may be used to perform this function.

A volatile memory 225, such as Random Access Memory (RAM), is also connected to memory bus 210. Volatile memory 225 stores the instructions and data needed by CPU 205 to perform software instructions for processes such as the processes required for providing a system in accordance with this invention. One skilled in the art will recognize that any number of types of memory may be used as volatile memory and the exact type used is left as a design choice to those skilled in the art.

I/O device 230, keyboard 235, display 240, memory 245, network device 250 and any number of other peripheral devices connect to I/O bus 215 to exchange data with CPU 205 for use in applications being executed by CPU 205. I/O device 230 is any device that transmits and/or receives data from CPU 205. Keyboard 235 is a specific type of I/O that receives user input and transmits the input to CPU 205. Display 240 receives display data from CPU 205 and display images on a screen for a user to see. Memory 245 is a device that transmits and receives data to and from CPU 205 for storing data to a media. Network device 250 connects CPU 205 to a network for transmission of data to and from other processing systems.

The present invention is an evolution of social networking to a third generation of social networking products. This third generation is different from social networks currently available from engines such as Facebook.com, Myspace.com and others.

A social network provided in accordance with this invention is intended to blur the physical world with the on-line world by introducing the concept of "social object". The intent of such a social network is to record all activities of all social objects, enable a bridging between the virtual and physical realms, and to link users with services. These networks collect data from interactions with the network and process the interactions against the social objects and social service database to form relationships amongst the "social objects". This allows "social kinetics" or attributes that are associated with the object and/or users interacting with the object to be implemented and analyzed. In accordance with this invention, a social object may be an event, such as an outing to a movie, a place, such as a restaurant, or an object, such as a picture. The users may interact with the object to communicate with other users. The system may then analyze these interactions to determine content that a user may be interested in to introduce other social objects or users to the user to enhance the user's use of the network.

"Social flows" or interaction between "social object" are integrated in accordance with embodiments of this invention. By analyzing these social flows, more information may be ascertained about individual users to allow a specific content of interest to be presented to the user through the social networking site. The analysis may be implemented by looking at the associations between different users and/or events and detection key words from postings to a social network engine. Furthermore, the analysis may be used to determine related key words to better associate content and users.

Systems may analyze data using the concept of "social objects" in the following manner. First, "social associations" between the users and "social objects" may be studied. These components will be used to determine a "social vocabulary". From the "social vocabulary", "social activities" may be determined. From these "social activities", "social clusters" or associations between users may be determined. "Social locations" or locations that user's physical interactions occur may also be determined from the "social activities". The "social locations" may then be used to determine the "social preferences" of a user or a group of users.

"Social weight" is a metric of a users influence on others. "Social weight" is calculated by invitations to events that a user sends to others using the social network and studying the number of positive responses to each invitation. This result is a percentage of users that respond which corresponds to the "social weight" of the user. The greater the "social weight" of the user, the more likely the user is to influence others. Thus, these users should be targeted with advertisements as the opinions and posts of these users are likely to influence the thinking of others. In the attached flow charts, an application for a concept of determining "social weight" to target specific content to users and/or groups users is shown. This application will be described below.

"Social behaviour" may be determined by monitoring posts by users to a social network. All of the content that a user posts to a social network may be searched for one or more key words that relate to a particular product or type of product. Those users that have added content to the site that includes the searched key words may then be targeted with content, such as advertisements of products, that is related to the key words.

The concept of "social behaviour" may also be applied in a more particular manner such as analyzing events that the user has attended. In the shown example, the system searches "events" and "activities" related to certain events that a user has posted an acceptance to attend. In the shown example, the system looks for particular "activities" that are related to events and finds those users that posted an acceptance to one of these "activities". The system may then direct content to the users that have posted an acceptance to the "activities" searched.

"Social location" is a registered location of a user. The social network may store location information about a user that is supplied by either a user input or by a device that is used to access the engine of the social network. The "social location" of the user may then be compared to a "social location" of a "social object", such as an event or a business, and if the "social location" of the user is within a defined proximity of the "social location" of the "social object", information about the "social object" is provided to the user.

"Social preferences" are activities that are of interest to a user based upon the text in posts by a user. A process of searching for users with similar "social preferences" is performed in the following manner. First, key words of a particular interest are searched for in posts from a group of users. Those users that have provided posts to the engine of the social network that include the searched key words are grouped together. Content for this particular preference may then be directed to the identified users.

A social network provided in accordance with the invention has numerous advantages. In particular, the present invention provides a social network site that is able to better customize content provided to a particular customer. Thus, keeping the users interested in the social network engine to maintain traffic to an engine.

In accordance with some embodiments of this invention, a social network provides "social objects" in the following manner. "Social objects" are divided into 6 classes. The "social objects" that are member of a class are stored in a database table particular to the class and a separate database table is maintained for each class. In accordance with these embodiments, the 6 classes are person, place, thing, activity, vocabulary, and service. Each "social object", regardless of the class to which the "social object" belongs has associated attributes. The attributes associated with each particular "social object" depend upon the class of the objects.

In accordance with embodiments of this invention, the person class has the following attributes name, gender, age, e-mail address, interests and other attributes. The primary attribute of the person class is the name. The other attributes are considered secondary attributes. Each attribute is stored as a separate field in the database table storing "social objects" for persons. An example of a database table for the person class in accordance with an embodiment of this invention is given in the following table:

| Name (Primary Key) | Age | Gender | Email Address | Contact Number | Interest | Attributes |
|---|---|---|---|---|---|---|
| | | | | | | |

In accordance with embodiments of this invention, the thing class includes the following attributes, a system generated identifier, and other attributes. The primary attributes is the identifier and the other attributes are secondary attributes. Each attribute is stored as a field in the database table storing social objects for things. An example of a database table for the thing class in accordance with an embodiment of this invention is given in the following table:

| Object Number (Primary key) | Name | Date | Time | Attributes |
|---|---|---|---|---|
| | | | | |

In accordance with embodiments of this invention, each "social object" in the place class the following attributes. The primary attribute is 'area polygon'. The area polygon describes the local of the place. Other secondary attributes include a physical address of the place and other attributes. Each attribute is stored as a field in the database table storing social objects for places. An example of a database table for the place class in accordance with an embodiment of this invention is given in the following table:

| Area Polygon (Primary Key) | Address | Table | Date | Time | Attributes |
|---|---|---|---|---|---|
| | | | | | |

In accordance with embodiments of this invention, each "social object" in the activity class includes the following attributes. The primary attribute is a system assigned identifier, such as a 'serial number' automatically generated by the system. Other attributes are secondary attributes. Each attribute is stored as a field in the database table storing social objects for activities. An example of a database table for the activity class in accordance with an embodiment of this invention is given in the following table:

| Activity Number (Primary Key) | Name | Date | Time | Attributes |
|---|---|---|---|---|
| | | | | |

In accordance with embodiments of this invention, each "social object in the vocabulary class include a primary attribute of a text identifier. Other attributes are considered secondary attributes. Each attribute is stored as a field in the database table storing social objects for the vocabulary class. An example of a database table for the thing class in accordance with an embodiment of this invention is given in the following table:

| Text (Primary Key) | Date | Time | Attributes |
|---|---|---|---|
| | | | |

In accordance with embodiments of this invention, each "social object" in the service class includes the following attributes. The primary attribute is a system assigned identifier, such as a 'serial number' automatically generated by the system. Other attributes are secondary attributes. Each attribute is stored as a field in the database table storing social objects for services. An example of a database table for the service class in accordance with an embodiment of this invention is given in the following table:

| Service Number (Primary Key) | Name | Date | Time | Attributes |
|---|---|---|---|---|
| | | | | |

In accordance with embodiments of this invention, each social object regardless of class will have a separate database table to record all transactions. All other social objects' values in the corresponding classes are recorded against this table together with a date and time stamp.

In accordance with these embodiments, an example of a searching of the database table of a search for associating social objects is given below. In the example associations are made for a person class social object. One skilled in the art will recognize that this is one particular example of the associations made between a particular social object to other social objects and that associations for other types of social objects may be performed in a similar manner.

In accordance with this example, a person class social object is created in the social network system for 'Fredrick'. Fredrick then interacts with the social network and the database table maintained for the 'Fredrick' social object is populated as shown in the following table:

| People | Thing | Place | Activity | Vocabulary | Service | Date | Time |
|---|---|---|---|---|---|---|---|
| Lisa | Apartment | Orchard Rd | Buy | ION | Service Number 1234 | 1$^{st}$ April 2011 | 3:05 pm |
| Nathan | Apartment | Orchard Rd | Buy | ION | | 3$^{rd}$ April 2011 | 4:15 pm |
| Nathan | Apartment | Oxford St | Buy | Kentish Lodge | | 3$^{rd}$ April 2011 | 6:07 pm |
| Self | Levis Jeans | Bugis Junction | Shopping | Denim | | 5$^{th}$ April 2011 | 8:02 pm |
| Stan | Star Bucks | Beach Rd | Coffee | Break | | 7$^{th}$ April 2011 | 8:27 pm |
| Self | Sofa | 10 Holland | Buy | Black colour | Service Number 8889 | 8$^{th}$ April 2011 | 11:34 pm |

The following is an example of a database table created for the activity of 'Buying'. The table is populated by interactions of users with the social network.

| People | Thing | Place | Activity | Vocabulary | Service | Date | Time |
|---|---|---|---|---|---|---|---|
| Lisa | Apartment | Orchard Rd | Buy | ION | Service Number 1234 | 1$^{st}$ April 2011 | 3:05 pm |
| Nathan | Apartment | Orchard Rd | Buy | ION | | 3$^{rd}$ April 2011 | 4:15 pm |
| Nathan | Apartment | Oxford St | Buy | Kentish Lodge | | 3$^{rd}$ April 2011 | 6:07 pm |
| Frederick | Sofa | 10 Holland | Buy | Black colour | Service Number 8889 | 8$^{th}$ April 2011 | 11.34 pm |

In accordance with this embodiment, a social object 'crawler' will run continuously as a background routine to establish association amongst the social objects. The crawler searches through each class transaction table to establish associations between the various social objects. This search is performed on three levels.

The first level searches for an exact search expression. In the given example the expression may be:

Select People='*' where Activity='Buying' and
Thing='coffee table' and Place='Orchard Rd'

The value for Activity='Buy' and Thing='coffee table' and Place='Orchard Rd' are automatically inserted. A counter then records the number of times the value occurs within a transaction table of each class. In the present example, the activity table for 'buying' appeared three times and therefore will be moved upwards to be inserted as the 'value' in the Select statement. The system will then replace with the next most recurring value. All of the social objects that meet the criteria are then returned and presented as an associated social object.

In accordance with this embodiment, the 'crawler' then performs a second level search of every social object in that class. This search is applied to all classes. In the present example the exact expression is:

Select People='*' where Activity='Buy' and
Thing='Apartment' and Place='Orchard Rd'

All of the social objects that meet the criteria are then returned and presented as an associated social object.

The crawler then performs a third level search in which every social object that appears in both results is searched using the search term. All of the social objects that meet the criteria are then returned and presented as an associated social object.

In accordance with embodiments of this invention social objects may be created in the following manner. First, a 'name of the object' is entered. The system then determines whether an object for the name already exists. If an object for the name does not exist, a new object is created. The system then interacts with the user to receive inputs of attributes and values for each attribute. One skilled in the art will recognize that a default value for each attribute may be assigned by the system at the time a new social object is created. The value is then changed as more data is created through user interaction with the network. The new "social object" is then stored in the appropriate table database.

In accordance with some embodiments of the invention, attributes may be added to a social object in the following manner. If 'value' appears for an 'attribute' over N times, the attribute is added to the "social object". The attributes are then compared and are associated to the social object in ascending order.

The following are descriptions of the accompanying flow charts of processes for implementing embodiments of processes that implement some of the processes described above.

One particular process for providing social objects in accordance with embodiments of this invention is "orbbing". "Orbbing" is the process of making a social object representing a real world object. In particular, "orbbing" changes a digital image and/or video stream into a social object as discussed in the first and second pages of the slides. The process of "orbbing" is performed by providing a database that includes records that link portions of the image to text fields describing the portions. The process then embeds a link into the data of the image that allows a viewer to use a pointing device to direct a web browser to get the data from the desired link while viewing the image. Users are then allowed to create further records that link portions of the image to additional text. This is referred to as social tagging and shape tagging of the image and/or stream. One skilled in the art will recognize that although this embodiment of "orbbing" is discussed with regards to an image, a streaming video may also be tagged by selecting particular images in the stream without departing from this invention.

The process of "orbbing" and image and/or video stream may be performed by a social network engine the following manner in accordance with embodiments of this invention. The process begins by receiving an image. A user then uses the process to create "hot zones". Creating "hot zones" means that a user identifies particular portion of the image for which the user wants to provide a text comment. After all of the "hot zones" are identified, the user applies social attributes. In other words, the user inputs a comment. A text comments may refer to other links i.e. referring to a cultural database or may be a new input added to the database i.e. shaping the cultural database. The process then performs the "orbbing" which is the embedding of a link to the cultural database into the image. In other embodiments, the link may be a link to a particular web site that provides a product or service associated with the "orbbed" object. The process then allows other users to access the image to define further "hot zones" and add further social attributes i.e. comments.

"Social tagging" refers to creating culture through the normalization of nouns and adjectives describing a social object, such as an "orbbed" image. A process for performing "social tagging" of an image and/or video stream is performed in the following manner in accordance with this invention. The process begins by retrieving a social object. The process then reads all of the social nouns and adjectives associated with the social object. An iterative process is then performed in which the frequency or number of references to a particular social adjective is determined. If the frequency of occurrence is greater than a certain threshold, the social adjective is added to a social cultural template. The iterative process is performed for each of the social adjective found to be associated with the social object. The social cultural template is then added to the cultural database and the process ends.

"Shape tagging" is the process of identifying "hot zones" in accordance with embodiments of this invention. "Hot zones" are portions of an image that the user would like to associate with a particular text data, such as a name, a web-link, or other identifier. The process of "shape tagging" analyzes the portion of interest in the image and determines "vector points". The process then requests text data to associate with the "vector points". The process of "shape tagging" will also allow a user to adjust the vector points or edit the associated text.

"Shape tagging" is performed in the following manner in accordance with embodiments of this invention. Shape recognition begins with creating "hot zones". It is envisioned that the "hot zones" are user defined portions of the image that a user may select using a cursor and pointing device. The process then places vector points over a shape in the "hot zone" and shows the vector points the user super-imposed over the image. The user may then adjust the vector points to better define the image. When the vector points are completed, the object is added to a shape recognition database. The process is then repeated for additional shapes in a particular portion of the image and for each other selected portion or "hot zone" of the image.

In viewing an "orbbed" image, a user may perform a process termed a "social object finder". The social object finder is a process used by user to retrieve information about the portions in the image. In one embodiment, the database maintaining the information about the images is loaded into a device accessing the image over a network connection. This database may also be maintained on the device in memory and only updated when a network connection is made. The user then views the image on the display. If the user wants to see the associated text for a portion of the picture, the user uses a pointing device to "click" a portion associated with the information. The database is then searched for the information and the retrieved data is displayed to the user.

Figure 3:
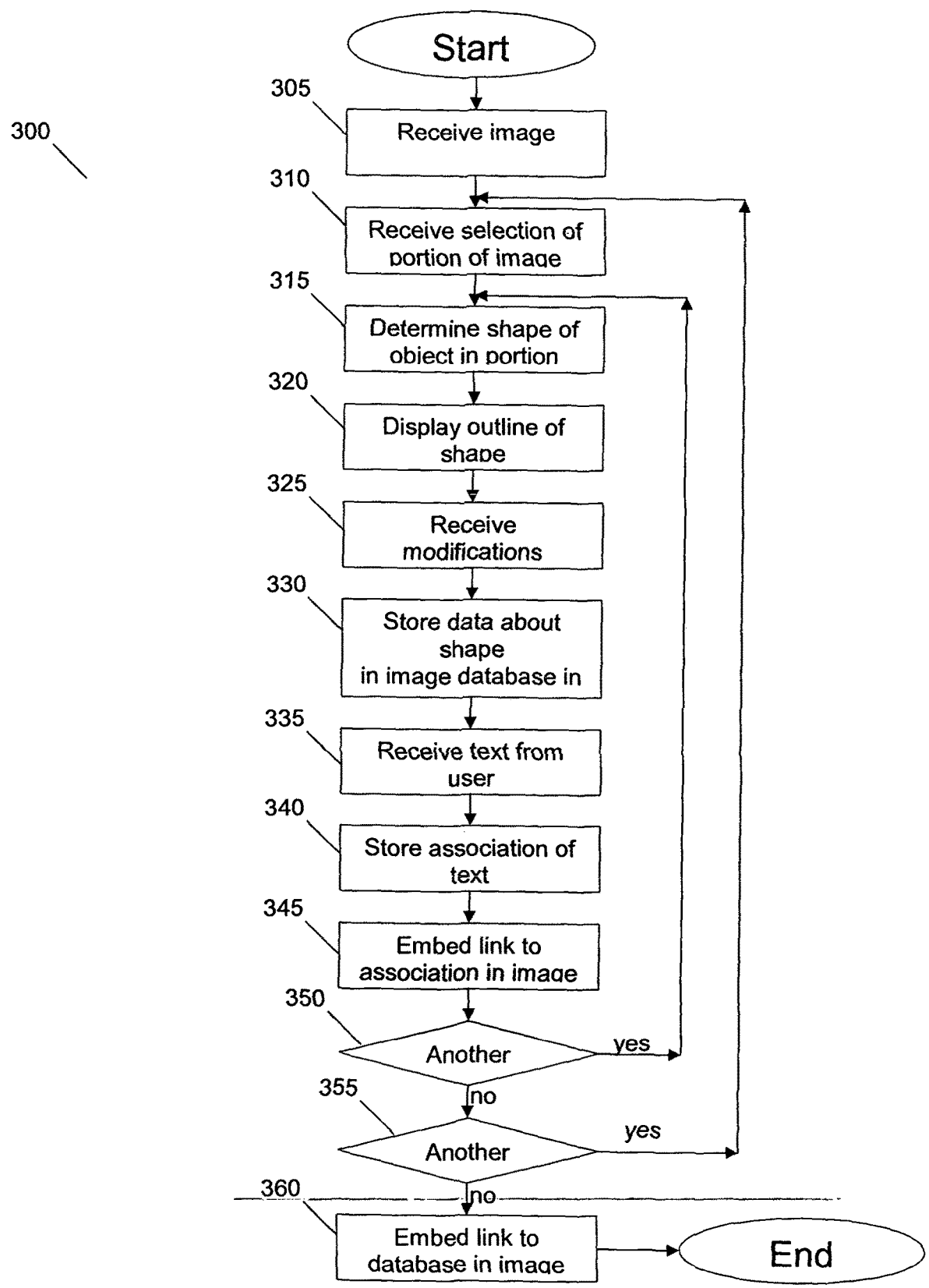
FIG. 3 illustrating a flow diagram of a process for "orbbing" an image in accordance with embodiments of this invention.

One embodiment of a process for "orbbing" an image, such as photograph or a frame from a video stream process for associating text with shapes in the image in accordance with an embodiment of this invention is illustrated in FIG. 3. Process 300 may be implemented in an image capture device or by the system of a content provider of a particular website. The process begins by receiving image in step 305. In step 310, a selection of a portion of the image is selected by a user. The selection may be input by using a "drag and drop" feature or some other feature incorporated with an input device. A shape of an object in the selected portion is identified in step 315. This may be performed in several manners, including but not limited to, pixel contrast comparisons, and/or comparisons of pixels to images of known objects.

After a shape has been identified in the image, an outline of the shape is displayed for the user in step 320. The user is then allowed to input modifications to the shape in step 325. The user may input the modification using a pointing device using a feature such as "drag and drop". One skilled in the art will recognize that other methods of inputting the modifications may be used without departing from this invention. After the outline of the shape is identified, the system stores data about the shape in a record for the image in an image database in 330.

The process then receives an input of text from the user in step 335. The text may be input using a key board, key pad, or other Input/Output device. In accordance with some embodiments, a prompt such as a dialog box may interrogate the user to receive the inputted text. The dialog box may also be completed automatically based upon inputs by the user in some embodiments. The text may be a description, web site address, or any other type of information that the user wants to share about the selected object. An indicator identifying an association of the text to the shape is then stored in record of the image in the image database in step 340. The indicator may be an icon or an overlay of the shape upon the object in the image, or some other manner of showing that the object is an object of interest in the image. The indicator is then embedded into the image in the 345.

The process then determines whether there is another object in the selected portion of the image in step 350. If there is another object in the selected portion, process 300 repeats from step 315 for each subsequent object until all of the objects in the selected portion are handled in accordance with the user. If there is no another object in the selected, the process determines if the process has received an input of a subsequent selected portion in step 355. If another selection is received, process 300 repeats from step 310 for the subsequent portion. If another selection is not received, a link to the image database is embedded into to the picture in 360. The embedded link is an address to the record of the image in an image database that allows a user to access the record for the image over a network in order to view the content. After the link is embedded, process 300 ends.

Figure 4:
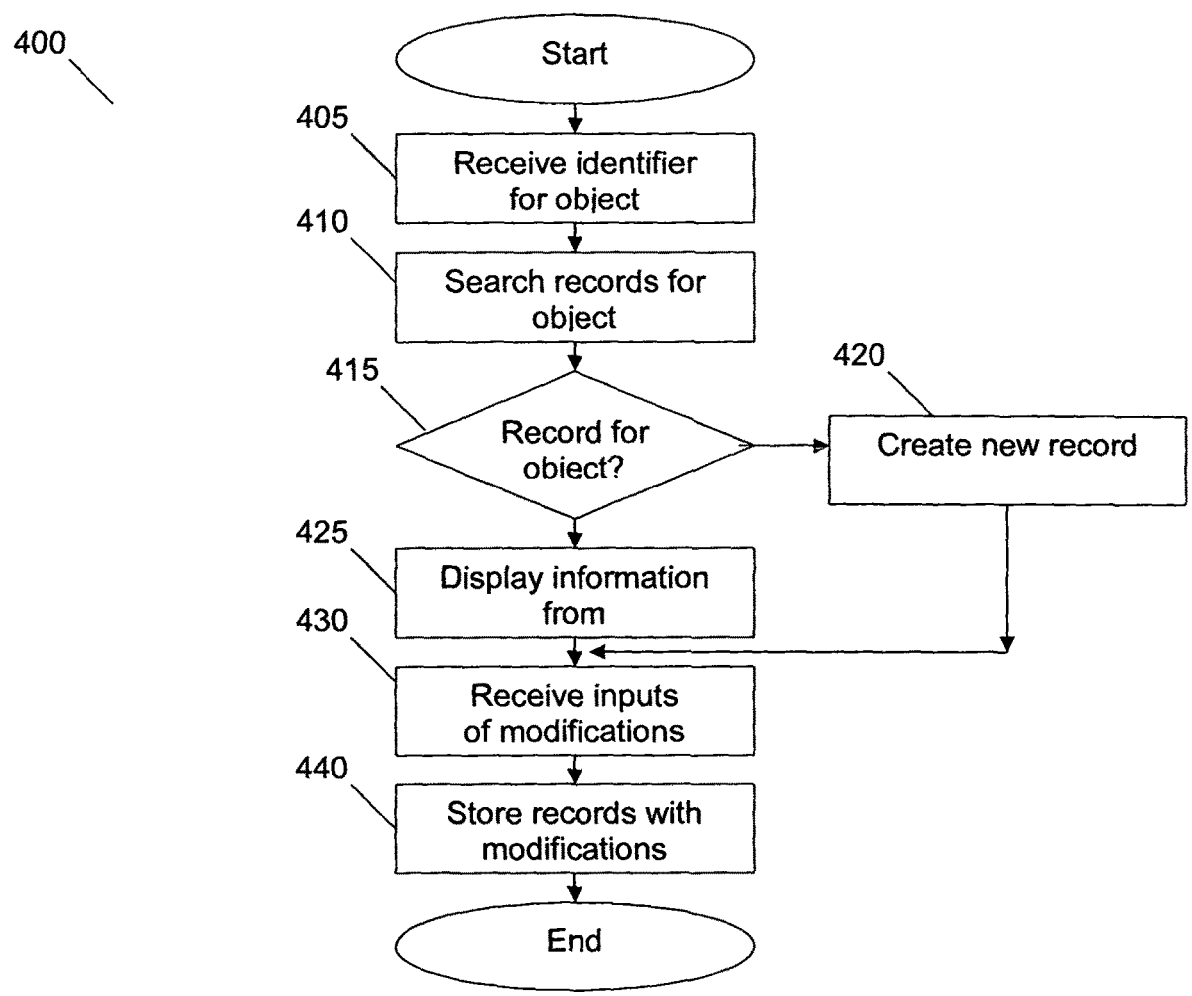
FIG. 4 illustrating a flow diagram of a process for displaying and capturing information about an object "orbbed" in an image in accordance with embodiments of this invention.

FIG. 4 illustrates an exemplary process for performing steps 330 and 335 for receiving and storing information about a selected object in accordance with an embodiment of this invention. Process 400 begins in step 405 by receiving an identifier of the object. This may be received as input in a dialog box or through other methods in accordance with this embodiment. The database or other structure is then searched for a record associated with the identifier in step 410. In step 415 the process determines whether a record for the object was found. If a record is not found, a new record is created for the object in step 420. If a record for the object is found, the information about the object stored in the record is displayed in step 425. This may be performed by displaying the information in particular fields in a dialog box or a similar manner. The user may then input modifications to the information in step 430. This may be performed by editing the information in the fields, adding information to unused fields, or in any other manner. If the record is a new record, the modification is the entering of the information for the new object. The modified information is then stored in the record in step 435 and process 400 ends.

Figure 5:
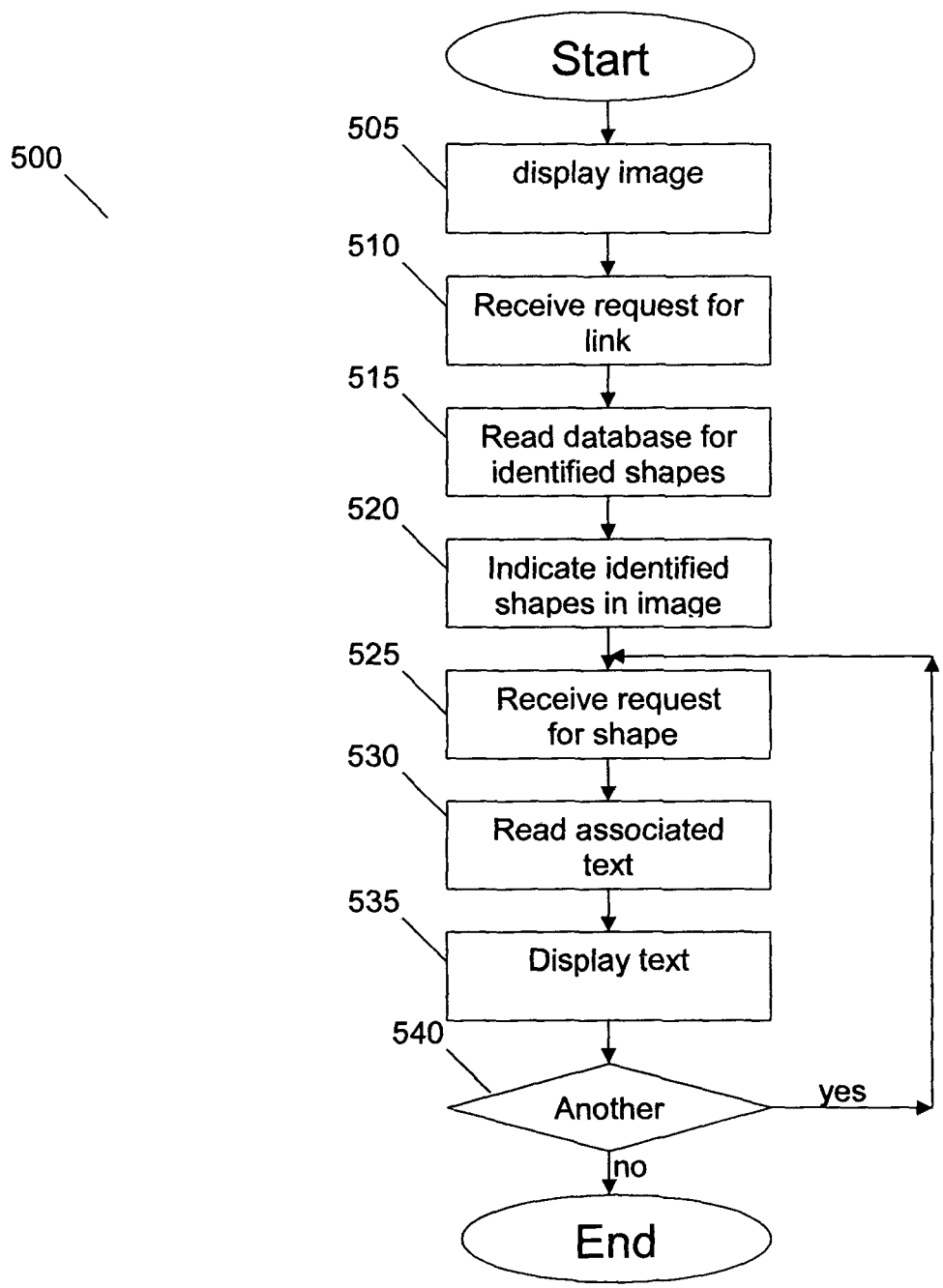
FIG. 5 illustrating a flow diagram a process for displaying an "orbbed" image and associated information in accordance with embodiments of this invention.

FIG. 5 illustrates a process for presenting information associated with a shape in an image in accordance with an embodiment this invention. The process begins in step 505 by displaying the image. The process then receives a request for the links to associated information for the image in step 510. The input may be a click over a pre-defined portion of the image using a pointer. The process then reads data about all of the shapes in the image that have associated text in step 515. The process is performed by retrieving all of the shapes linked to the image and reading a record for an object associated with each shape.

The shapes are then indicated in the picture in step 520. The indication may be provided by superimposing an outline over the object or any other method that makes the shapes easily identifiable. The process then receives a request from the user for the text associated with a particular shape in step 525. The request may be received in the form of a "click" using a pointing device or any other form. The process then reads the text associated with the shape from the record of the object stored in the image database in step 530. The read information is then displayed in some manner in step 535. In some embodiments, the text may be superimposed over the image near the shape or may be provided in a text box under the image on the display. The process then waits to receive another selection in step 540. If another selection is received, the process repeats from step 530 for the new shape. If another selection is not received or a request to end the viewing is received, process 500 ends.

Figure 6:
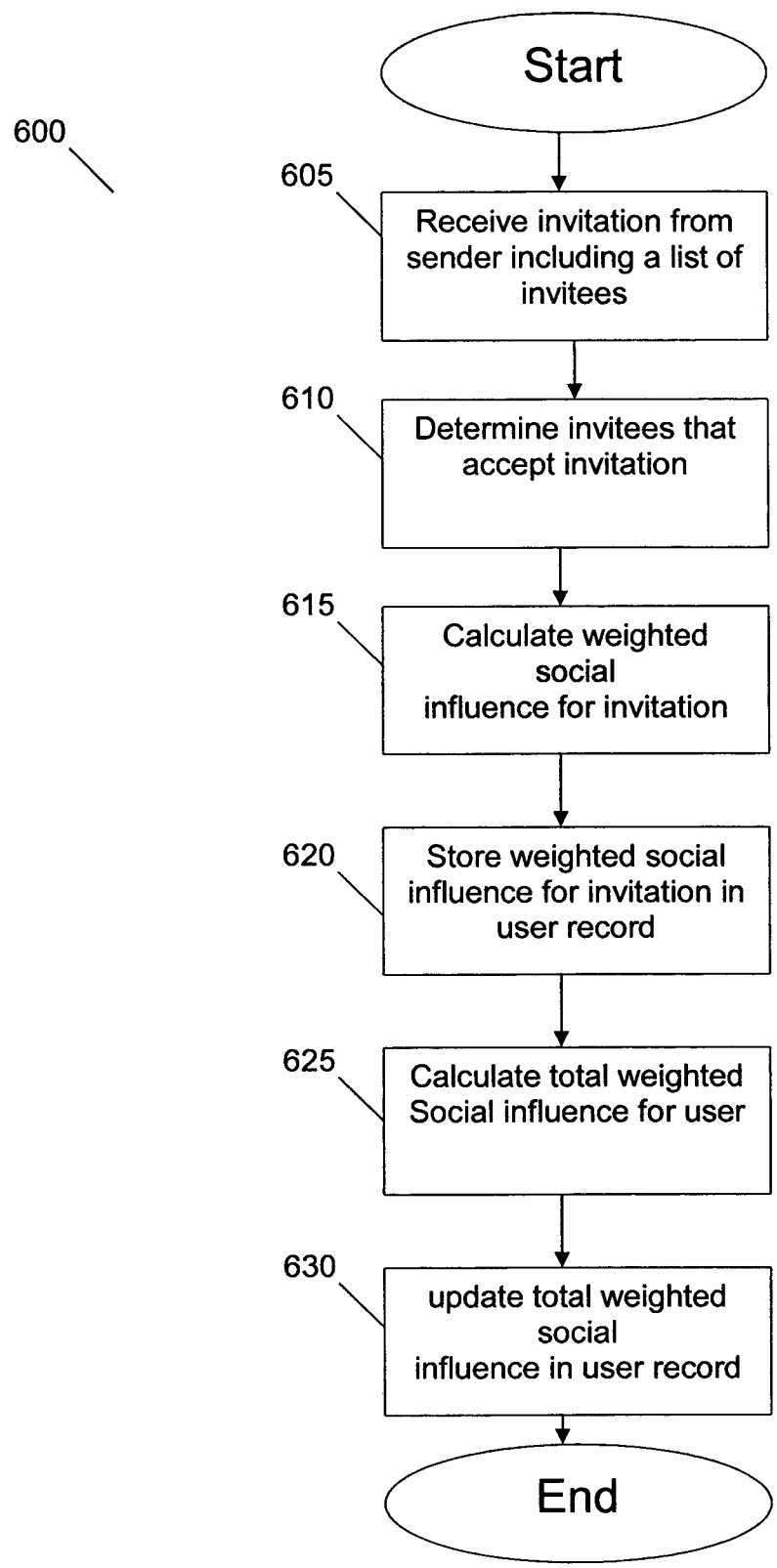
FIG. 6 illustrating a flow diagram of a process for determining social influence of a user in accordance with embodiments of this invention.

A further aspect of this invention is using the data collected from the creation and use of social objects. Some embodiments of this invention may information to calculate the "social weight" of a user an exemplary embodiment of a process for determining "social weight of a user is shown in FIG. 6. "Social weight" is a quantitative measure of the influence that a user has on others. "Social weight" may be measured on a "per event" basis and/or a "Total Social weight" that measures the overall response to posts by user. Process begins in step 605 in which an invitation to an event that includes a list of invitees is received by the social network engine. The system then determines the invitees on the list of invitees that post an acceptance to the invention in step 610.

The social weight for the event is calculated in step 615 and stored in a memory for future use in step 620. The social weight of the event is determined by dividing the number of invitees that posted an acceptance by the number of invitees on the list of invitees. After the social weight of the user for the event is determined, a total social weight of the user is updated in step 625. A new total social weight is determined by adding the social weights for all of the events posted by the user divided by the total number of events that the user has posted to the social network site. The process then ends by storing the updated total social weight.

Figure 7:
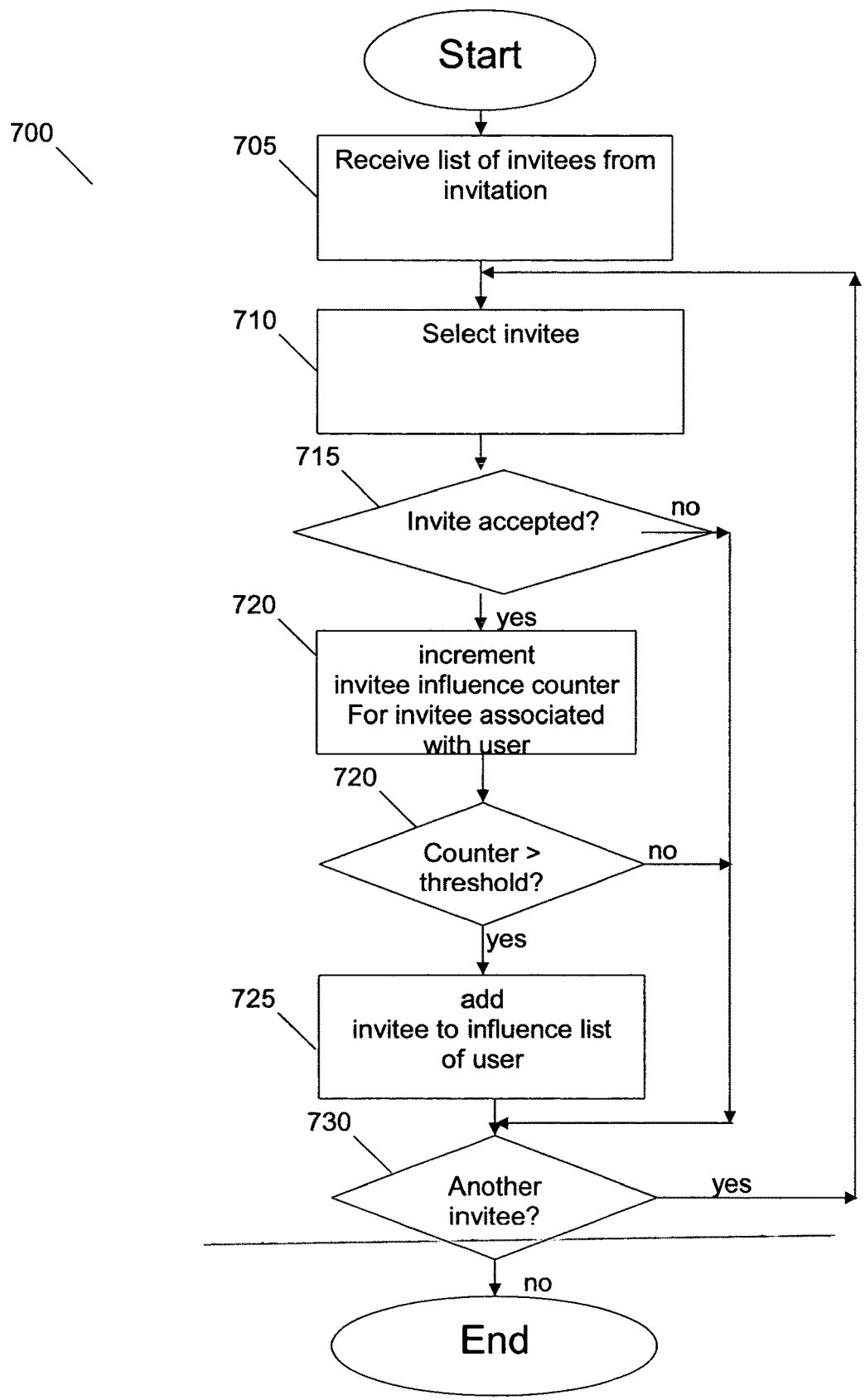
FIG. 7 illustrating a flow diagram of a process for generating and maintaining a list of influenced users in accordance with embodiments of this invention.

FIG. 7 illustrates an embodiment of a process for adding influenced users to an influenced first of a first user. Process 700 begins by receiving an invitation to an event by a user. The user inputs the invitation to the social network engine. The invitation includes a list of invitees. After the time that the event is scheduled to take place, the system retrieves the list of invitees for the event from a memory maintained by the engine in step 705. An invitee is then selected from the list in step 710. The system then determines if the selected invitee posted an acceptance of the invitation to the network in step 715. If not, the process repeats from step 710 for another user. If the invitee did accept the invitation, the system increments an influence counter that counts the number of invitations that the user accepts from this particular user in step 720. The system then determines whether the counter is greater than a predetermined threshold in step 725. The exact threshold used is left to one skilled in the art. However, the threshold should be selected to appropriately show significant influence of the user on this particular invitee. If the counter is greater than the threshold, the invitee is added to a list of influenced users that is associated with the user that originated the invitation in step 730. Process 700 then determines whether all of the invitees have been processed in step 725. If not, process 700 is repeated from step 710. After all of the invitees have been examined, process 700 ends.

Figure 8:
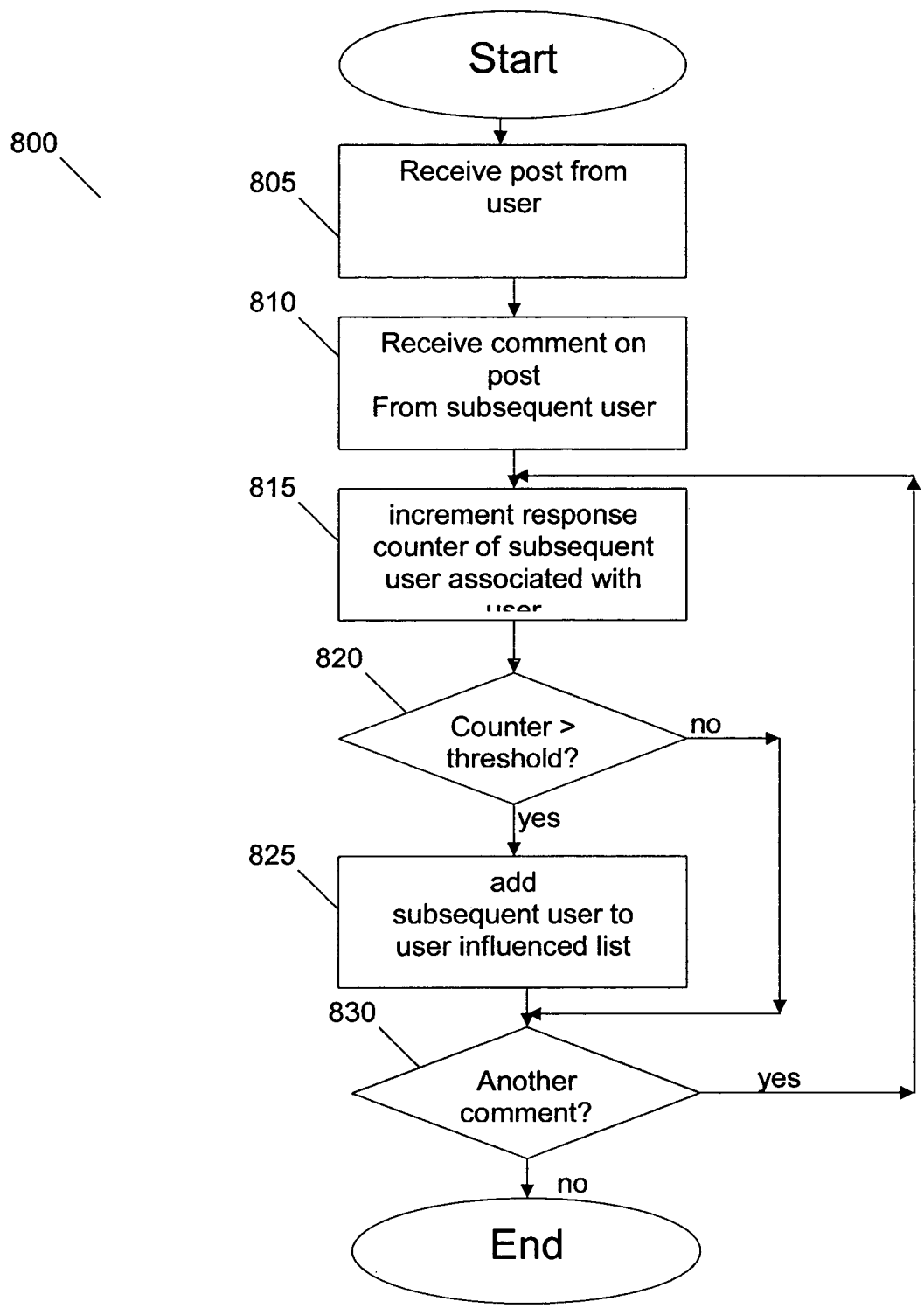
FIG. 8 illustrating a process for adding influenced users to a list of influenced users based upon posts to a social network in accordance with embodiments of this invention.

FIG. 8 illustrates an embodiment of a process for adding influenced users to a list for a first user based upon posts to the social network engine in accordance with embodiments of this invention. Process 800 begins by receiving a post of a comment from a first user in step 805. The post is then posted on the user pages of the social network engine. The system then waits to receive a comment from a subsequent user in step 810. A comment is text received input by a user to the page of the user in response to the post on the social network engine. When a comment is received from the subsequent user, the system increments an influence counter that counts the number of comments of the subsequent user to comments posted by this particular user in step 815. The counter is then compared to a threshold in step 820. The exact value of the threshold is left as a design choice left to those skilled in the art. However, the threshold should be chosen to be a number that represents a likelihood of influence of the particular user on the subsequent user. If the counter is greater than the threshold, the subsequent user is added to a list maintained in memory that stores users influenced by the particular user in step 825. The process then repeats when a subsequent comment is received.

Figure 9:
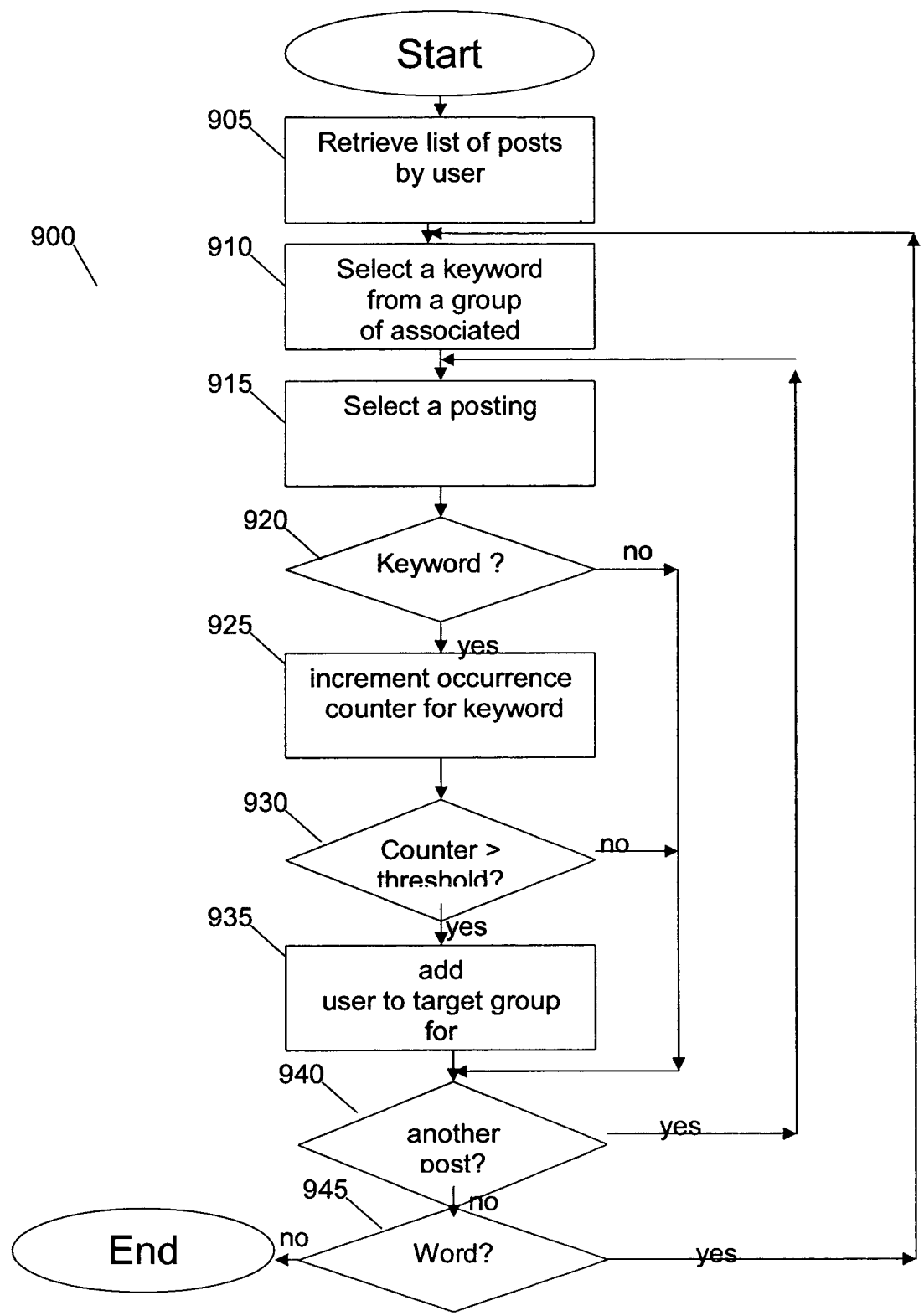
FIG. 9 illustrating a process determining whether a user is a member of a targeted group for content based upon posts to a social network in accordance with embodiments of this invention.

FIG. 9 illustrates an embodiment of a process for detecting key words in postings by user to a social network engine in accordance with embodiments of this invention. Process 900 begins by retrieving all of the postings of the user to the engine from a memory maintained by the engine in step 905. For purposes of this discussion, a posting may be any text entry that is received and stored by the social network engine. This may includes posts, comments, invitations and other actions that are provided by the social network engine.

A list of key words to search is then received by the system. The system then selects a key word from the list of key words in step 910. A posting from the list is then read by the system. The system then determines if the posting includes the key word in step 915. If the posting does not include the key word, the process continues to the next posting. Otherwise, the system increments a key word counter associated with the user in step 920.

The system then determines if the counter is greater than a threshold in step 925. The threshold should be chosen as an amount that will demonstrate an interest in the subject matter associated with the list of key words. The exact value of the threshold is left as a design choice for those skilled in the art. If the counter is not greater than the threshold, the process continues to the next posting. If the counter is greater than the threshold, the user is added to a list of users that is interested in the subject matter associated with the list of key words that is maintained by the system in step 930. This list will be used to send information, such as advertisements, relating to the associated subject matter to users on the list. This process is repeated for all of the postings to search for the selected key word in step 935. After all of the postings are searched for the selected key word, the process repeats for each of the other key words in the list in step 940.

Figure 10:
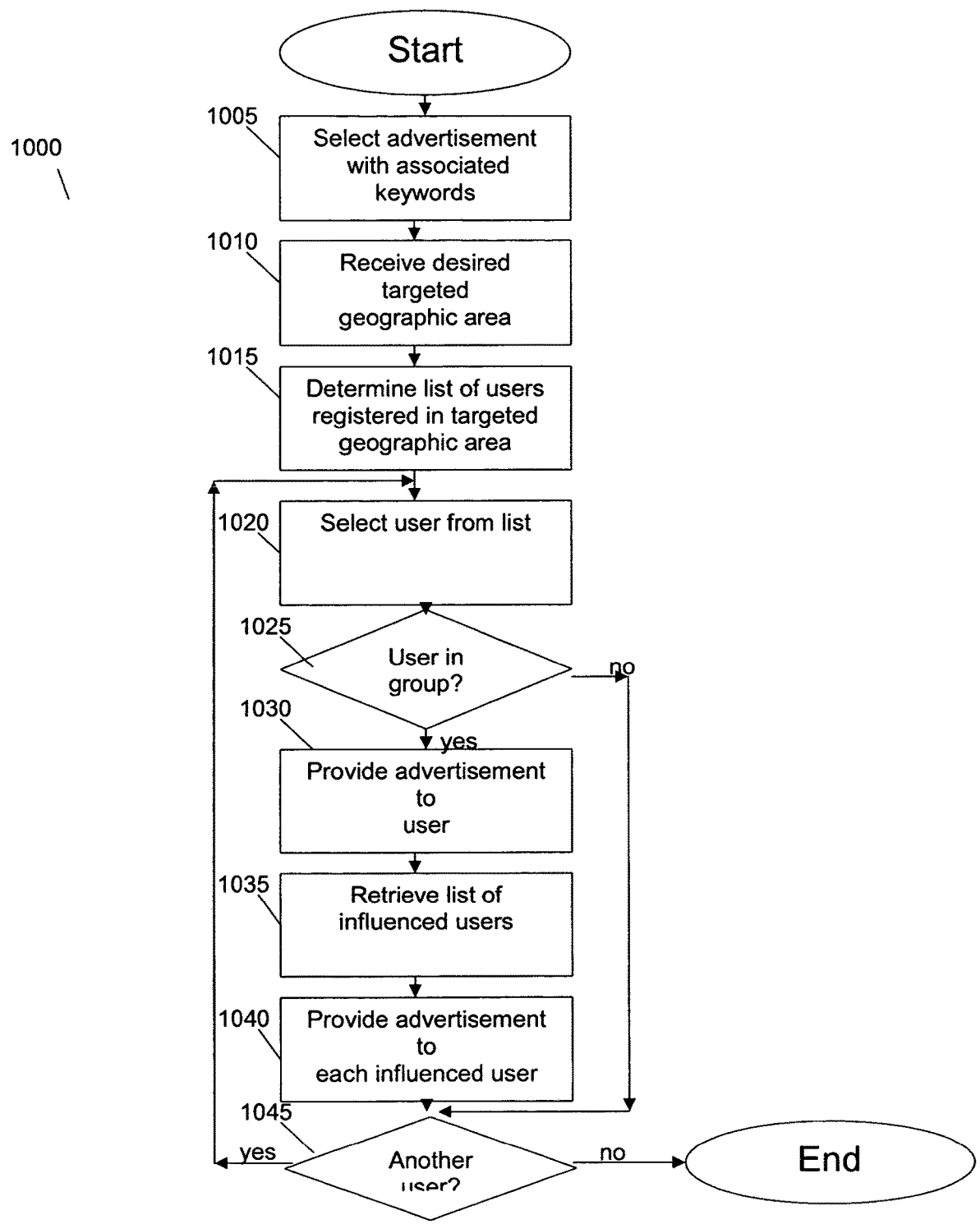
FIG. 10 illustrating a process for providing content to users based upon geographic targeting in accordance with embodiments of this invention.

FIG. 10 illustrates an embodiment of a process for specific targeting of users for advertisements based on key words and geographical area in accordance with this invention. The process begins by receiving advertisement or other content that is associated with a key word or list of key words in step 1005. The system then receives a desired geographic area where the content is to be targeted in step 1010. The desired geographic area may be city, postal code, or any other geographic demarcation. The system then performs a search in the records of users for users that have registered in the desired geographic area to generate a list of users in the desired area in step 1015. A user may register in a geographic area by providing registration information such as an address to the social network or this may be obtained from a device such as a smart phone used to connect to the engine providing the social network.

After the list of users in the desired area has been generated, the system selects a user from the list in step 1020. The system then determines whether the selected user belongs to the targeted group in step 1025. This determination may be made in a manner similar to the process for detecting key words in postings by user to a social network engine described above. If the user does not belong to the target group, the system selects another user in step 1045 and repeats the process. If the user belongs to the targeted group, the content is provided to the user in step 1030. The system may then retrieve the list of users influenced by the selected user and provide the content to each user in the retrieved list of influenced users in steps 1035 and 1040. The process is then repeated for another user until a determination is made for each of the users on the list of users registered in the targeted area in step 1045.

Figure 11:
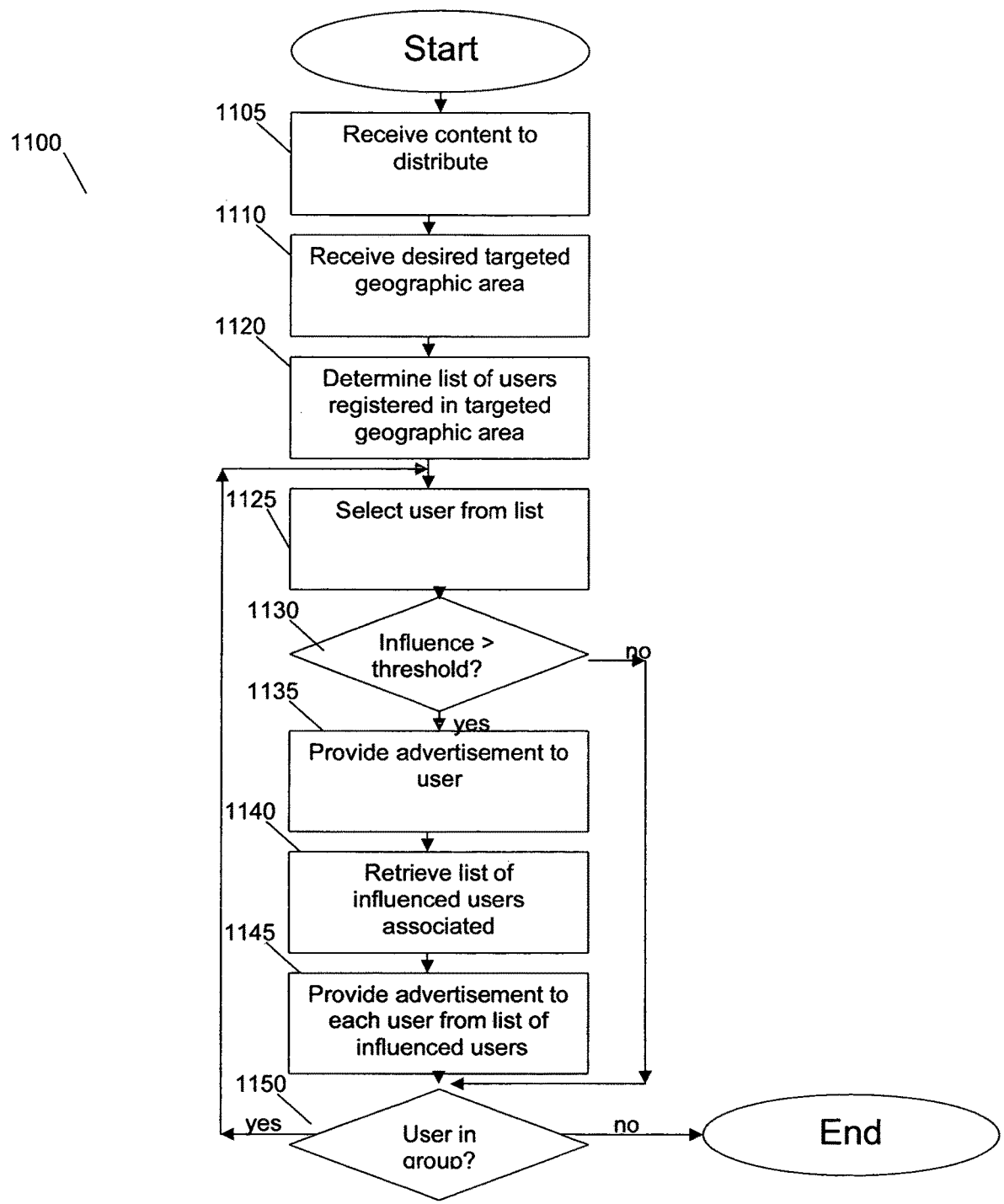
FIG. 11 illustrating a process for providing content to users based upon geographic location and social influence in accordance with embodiments of this invention.

FIG. 11 shows an embodiment of a process for selective geographic targeting of material in accordance with embodiments of this invention. Process 1100 begins in step 1105 by receiving content to distribute, such as an advertisement of an event at a particular store. The system then receives a desired geographic area where the content is to be targeted in step 1110. The desired geographic area may be city, postal code, or any other geographic demarcation. The system then performs a search in the records of users for users that have registered in the desired geographic area and generates a list of users in the desired area in step 1120. A user may register in a geographic area by providing registration information such as an address to the social network or this may be obtained from a device such as a smart phone used to connect to the engine providing the social network.

After the list of users in the desired area has been generated, the system selects a user from the list in step 1125. The system then reads the total social weight of user from a memory maintained by the engine. The total social weight of a user may be calculated in manner similar to that described with regards to the first flow chart above. The total social weight of the user is then compared to a threshold in step 1130. One skilled in the art will recognize that the threshold should be chosen to be a value that targets users that have a desired influence level on other users. However, the exact value is left as a design choice for those skilled in the art. If the user does not have the desired social influence, the system selects another user from the list and repeats the process in step 1150. If the user social weight is greater than the threshold, the content is provided to the user in step 1135. The system may then retrieve the list of users influenced by the user in step 1140 and also provide the content to each user in the list of influenced users in step 1145. The process is then repeated for another user until a determination is made for each of the users on the list of users in the targeted area in step 1150.

The above is a description of processes for providing "social objects" in a social network through the tagging of photographs and processes for using information collected from the provision of social contacts to direct data to users. It is envisioned that other can and will design alternatives that infringe this invention as set forth in the following claims.

What is claimed is:

1. A system for providing a social network engine comprising:

a processor; and a memory including instructions that, when executed by said processor, cause said processor to perform operations including:

maintain a plurality of database tables wherein each database table stores data for each social object of a particular one of a plurality of classes of social objects, the plurality of classes of social objects consisting at least a person class, a place class, a thing class, an activity class, a vocabulary class, and a service class, wherein a social object is a representation of a physical object on a social network;

establish, on said social network, an association between the plurality of social objects of the different classes consisting of the person class, the place class, the thing class, the activity class, the vocabulary class, and the service class, wherein said association is established between a first social object that corresponds to the person class, a second social object that corresponds to the place class, a third social object that corresponds to the thing class, a fourth social object that corresponds to the activity class, a fifth social object that corresponds to the vocabulary class, and a sixth social object that corresponds to the service class, wherein establishing the association includes providing a crawler that performs multiple searches of said plurality of database tables to find two or more social objects that have similar attributes, and wherein said multiple searches comprise three levels of searches such that a second level search is dependent upon results of a first level search and a third level search is dependent upon said results of said first level search and upon results of said second level search;

present said association between said plurality of social objects to a user, wherein said plurality of social objects is configured to interact with one another or with the user, wherein said social network is provided for said plurality of social objects and is configured to record all activities of all of said social objects;

analyze recorded activities of each of a plurality of social objects that are associated with a social object of the user including determining a social weight for the user that represents a number of social objects that respond to interactions initiated by the user divided by a total number of interactions with other social objects initiated by the user; and determine content to provide to the user on the social network based on the analysis of the recorded activities of the each of the plurality of social objects that are associated with the social object of the user by providing specific content to the user in response to the social weight of the user being determined to be above a specific threshold.

2. The system of claim 1, wherein said person class includes following attributes: name, gender, age, e-mail address, and interests;

said place class includes a following attribute: a location polygon describing a location;

said thing class includes a following attribute: a system generated identifier;

said activity class includes a following attribute: an assigned identifier;

said vocabulary class includes a following attribute: a text identifier; and said service class includes a following attribute: a text identifier.

3. The method of claim 1, wherein said crawler continuously searches as a background routine to establish associations between said plurality of social objects.

4. A method for providing a social network comprising:
maintaining a plurality of database tables,
wherein each database table stores data for social objects of a particular one of a plurality of classes of social objects, the plurality of classes of social objects consisting of at least a person class, a place class, a thing class, an activity class, a vocabulary class, and a service class,
wherein a social object is a representation of a physical object on a social network;
establishing, on said social network, an association between the plurality of social objects of the different classes consisting of the person class, the place class, the thing class, the activity class, the vocabulary class, and the service class,
wherein said association is established between a first social object that corresponds to the person class, a second social object that corresponds to the place class, a third social object that corresponds to the thing class, a fourth social object that corresponds to the activity class, a fifth social object that corresponds to the vocabulary class, and a sixth social object that corresponds to the service class wherein establishing the association includes providing a crawler that performs multiple searches of said plurality of database tables to find two or more social objects that have similar attributes, and wherein said multiple searches comprise three levels of searches such that a second level search is dependent upon results of a first level search and a third level search is dependent upon said results of said first level search and upon results of said second level search;
presenting said association between said plurality of social objects to a user,
wherein said plurality of social objects is configured to interact with one another or with the user,
wherein said social network is provided for said plurality of social objects and is configured to record all activities of all of said social objects;
analyzing recorded activities of each of a plurality of social objects that are associated with a social object of the user by determining a social weight for the user that represents a number of social objects that respond to interactions initiated by the user divided by a total number of interactions with other social objects initiated by the user; and
determining content to provide to the user on the social network based on the analysis of the recorded activities of the each of the plurality of social objects that are associated with the social object of the user by providing specific content to the user in response to the social weight of the user being determined to be above a specific threshold.

5. The method of claim 4, wherein
said person class includes following attributes: name, gender, age, e-mail address, and interests;
said place class includes a following attribute: a location polygon describing a location;
said thing class includes a following attribute: a system generated identifier;
said activity class includes a following attribute: an assigned identifier;
said vocabulary class includes a following attribute: a text identifier; and
said service class includes a following attribute: a text identifier.

6. The system of claim 4, wherein said crawler continuously searches as a background routine to establish associations between said plurality of social objects.

* * * * *